(12) United States Patent
Serres et al.

(10) Patent No.: US 8,123,470 B2
(45) Date of Patent: Feb. 28, 2012

(54) TURBINE ASSEMBLY WITH SEMI-DIVIDED NOZZLE AND HALF-COLLAR PISTON

(75) Inventors: Nicolas Serres, Epinal (FR); Quentin Roberts, Nancy (FR); Sebastien Ferrari, Thaon les Vosges (FR); Jerome Mitka, Houdemont (FR)

(73) Assignee: Honeywell International Inc., Morristown, NJ (US)

( * ) Notice: Subject to any disclaimer, the term of this patent is extended or adjusted under 35 U.S.C. 154(b) by 1236 days.

(21) Appl. No.: 11/836,993

(22) Filed: Aug. 10, 2007

(65) Prior Publication Data

US 2009/0041573 A1 Feb. 12, 2009

(51) Int. Cl.
*F01D 1/02* (2006.01)
(52) U.S. Cl. .................... 415/158; 415/157; 415/159
(58) Field of Classification Search ............... 415/157, 415/158, 167, 159
See application file for complete search history.

(56) References Cited

U.S. PATENT DOCUMENTS 6,536,214 B2 * 3/2003 Finger et al. .................. 60/602

FOREIGN PATENT DOCUMENTS

WO WO 2005040560 A1 * 5/2005
WO WO 2007058647 A1 * 5/2007

* cited by examiner

*Primary Examiner* — Edward Look
*Assistant Examiner* — Ryan Ellis
(74) *Attorney, Agent, or Firm* — Alston & Bird LLP

(57) ABSTRACT

A turbine assembly for a turbocharger includes a variable nozzle formed by a sliding half-collar piston. A first-stage nozzle has a plurality of first vanes supported by a first nozzle ring and extending axially therefrom. A second-stage nozzle has a second nozzle ring connected to the ends of the first vanes, and a plurality of second vanes extending axially therefrom. The piston regulates flow through the second-stage nozzle, while the first-stage nozzle remains open when the piston is fully closed. The second nozzle ring at least partially divides the first vanes from the second vanes. The half-collar piston includes recesses that receive the second vanes and only partially surround the girth of each second vane.

14 Claims, 5 Drawing Sheets

TURBINE ASSEMBLY WITH SEMI-DIVIDED NOZZLE AND HALF-COLLAR PISTON

BACKGROUND OF THE INVENTION

The present invention relates generally to turbochargers, and relates more particularly to exhaust gas-driven turbochargers having an axially sliding piston for varying the size of a nozzle that leads into the turbine wheel so as to regulate flow into the turbine wheel.

Regulation of the exhaust gas flow through the turbine of an exhaust gas-driven turbocharger provides known operational advantages in terms of improved ability to control the amount of boost delivered by the turbocharger to the associated internal combustion engine. The regulation of exhaust gas flow is accomplished by incorporating variable geometry into the nozzle that leads into the turbine wheel. By varying the size of the nozzle flow area, the flow into the turbine wheel can be regulated, thereby regulating the overall boost provided by the turbocharger's compressor.

Variable-geometry nozzles for turbochargers generally fall into two main categories: variable-vane nozzles, and sliding-piston nozzles. Vanes are often included in the turbine nozzle for directing the exhaust gas into the turbine in an advantageous direction. Typically a row of circumferentially spaced vanes extend axially across the nozzle. Exhaust gas from a chamber surrounding the turbine wheel flows generally radially inwardly through passages between the vanes, and the vanes turn the flow to direct the flow in a desired direction into the turbine wheel. In a variable-vane nozzle, the vanes are rotatable about their axes to vary the angle at which the vanes are set, thereby varying the flow area of the passages between the vanes.

In the sliding-piston type of nozzle, the nozzle may also include vanes, but the vanes typically are not rotatable about their axes for regulating flow to the turbine wheel. Instead, variation of the nozzle flow area is accomplished by an axially sliding piston that slides in a bore in the turbine housing. The piston is tubular and is located just radially inwardly of the nozzle. Axial movement of the piston is effective to vary the axial extent of the nozzle opening leading into the turbine wheel. When vanes are included in the nozzle, the piston can slide adjacent to radially inner (i.e., trailing) edges of the vanes; alternatively, the piston and vanes can overlap in the radial direction and the piston can include slots for receiving at least a portion of the vanes as the piston is slid axially to adjust the nozzle opening.

One of the design challenges with such sliding piston-type nozzles is to optimize the aerodynamics of the exhaust gas flow into the turbine wheel over the full stroke of the piston. In some sliding piston-type variable nozzles, flow disturbance can occur particularly in the beginning of piston stroke as the piston begins to move from its closed position toward a more-open position. More particularly, as the piston begins to open even a very small amount, the flow rate into the turbine can suddenly increase, making it difficult to regulate the piston stroke with sufficient accuracy to prevent a sudden flow surge.

BRIEF SUMMARY OF THE DISCLOSURE

The present disclosure relates to improvements in sliding piston arrangements for a variable nozzle in a turbocharger. In accordance with one aspect of the disclosure, a turbine assembly for a turbocharger comprises a turbine housing defining a bore extending along an axial direction and defining a chamber surrounding the bore for receiving exhaust gas, the chamber being open to the bore at a radially inner side of the chamber; a first-stage nozzle comprising a first nozzle ring mounted in the turbine housing and a plurality of circumferentially spaced first vanes each having a first end connected to the first nozzle ring and each extending generally parallel to the axial direction from the first end to an opposite second end; a second-stage nozzle comprising a second nozzle ring connected to the second ends of the first vanes and a plurality of circumferentially spaced second vanes each having a first end connected to the second nozzle ring and each extending generally parallel to the axial direction from the first end to an opposite second end; and a tubular piston disposed in the bore of the turbine housing, the piston being axially slidable relative to the turbine housing along the radially inner side of the chamber such that the piston blocks a variable portion of an axial length of the second-stage nozzle depending on axial position of the piston.

The piston in its closed position substantially closes the second-stage nozzle while the first-stage nozzle remains open such that exhaust gas flows to the turbine wheel via the first-stage nozzle. The piston in non-closed positions permits flow through the second-stage nozzle.

The first-stage nozzle can be optimized or designed for high efficiency when the exhaust gas flow rate is relatively low. The second-stage nozzle can be designed primarily for passing high mass flow when the engine is operating at high speed and/or high load.

The second nozzle ring serves as a divider at least partially separating the first-stage nozzle from the second-stage nozzle. In one embodiment, the second nozzle ring divides all of the second end of each first vane from all of the first end of each second vane.

In another embodiment, the second nozzle ring divides only a part of each first vane from a part of each second vane. More particularly, the second nozzle ring divides a leading edge region of the second end of each first vane from a leading edge region of the first end of each second vane, while trailing edge regions of the first and second vanes are not divided by the second nozzle ring. For example the trailing edge of each first vane and the trailing edge of each second vane can comprise a continuous vane portion in the axial direction. In contrast, for example, the leading edge of each first vane can be set at a different angle of attack from the leading edge of each second vane.

In some embodiments, the piston is a "half-collar" piston having a radially outer surface in which recesses are formed for respectively receiving the second vanes with a radially inwardly facing surface of each second vane confronting a radially outwardly facing wall of each respective recess. The recesses in the piston can surround only a fractional part of a girth of each second vane, hence the term "half-collar" as applied to the piston.

The piston can also define an end surface facing generally axially toward the second nozzle ring and having recesses for receiving portions of the second nozzle ring.

In some embodiments, the second end of each second vane comprises a free end, and the second ends of the second vanes abut a wall of the piston in the closed position of the piston and are spaced from the wall of the piston in non-closed positions thereof.

In the various embodiments, the second vanes engage the piston in a manner substantially preventing rotation of the piston about an axis thereof.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
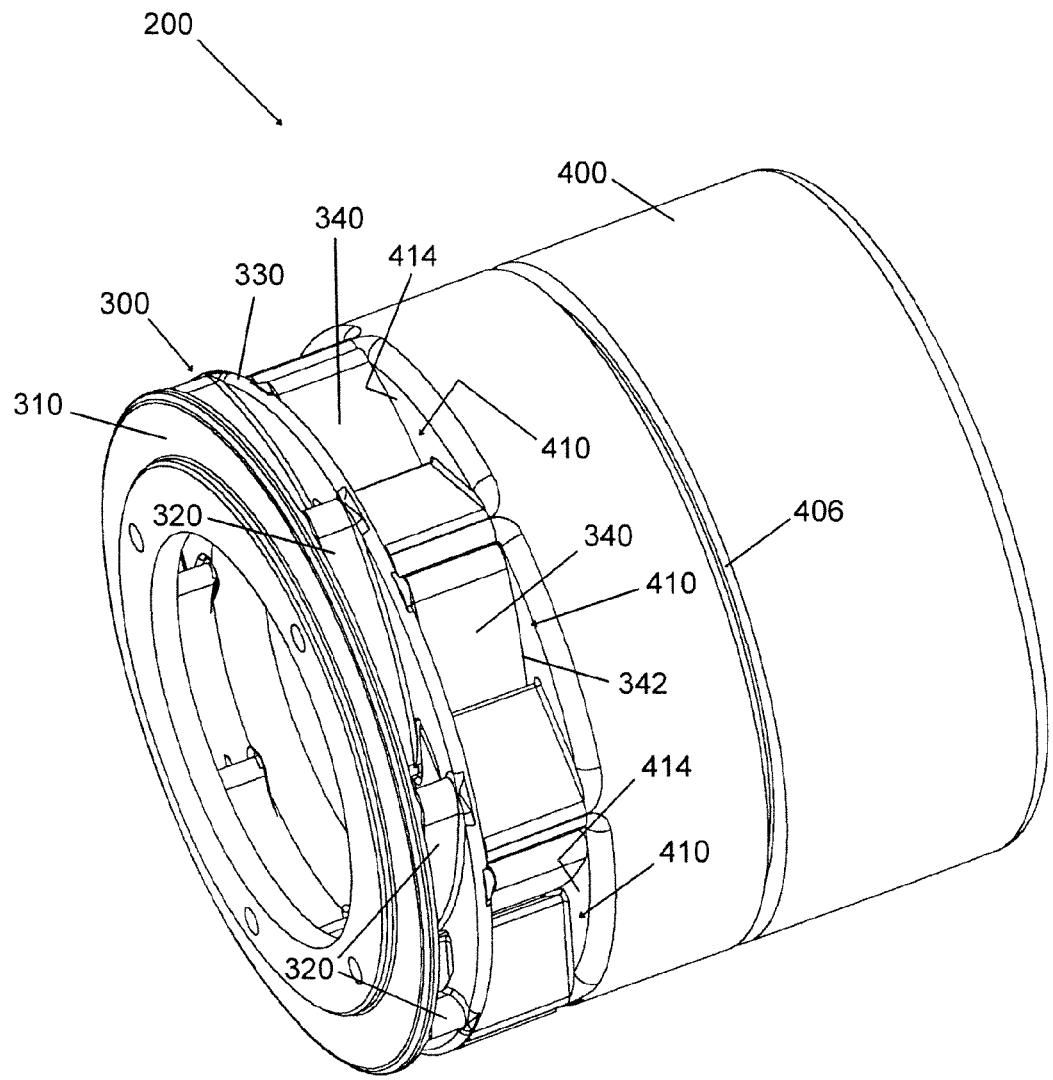
FIG. 1 is perspective view of a sub-assembly of a turbine assembly in accordance with one embodiment of the invention, showing the piston in the closed position.
Figure 2:
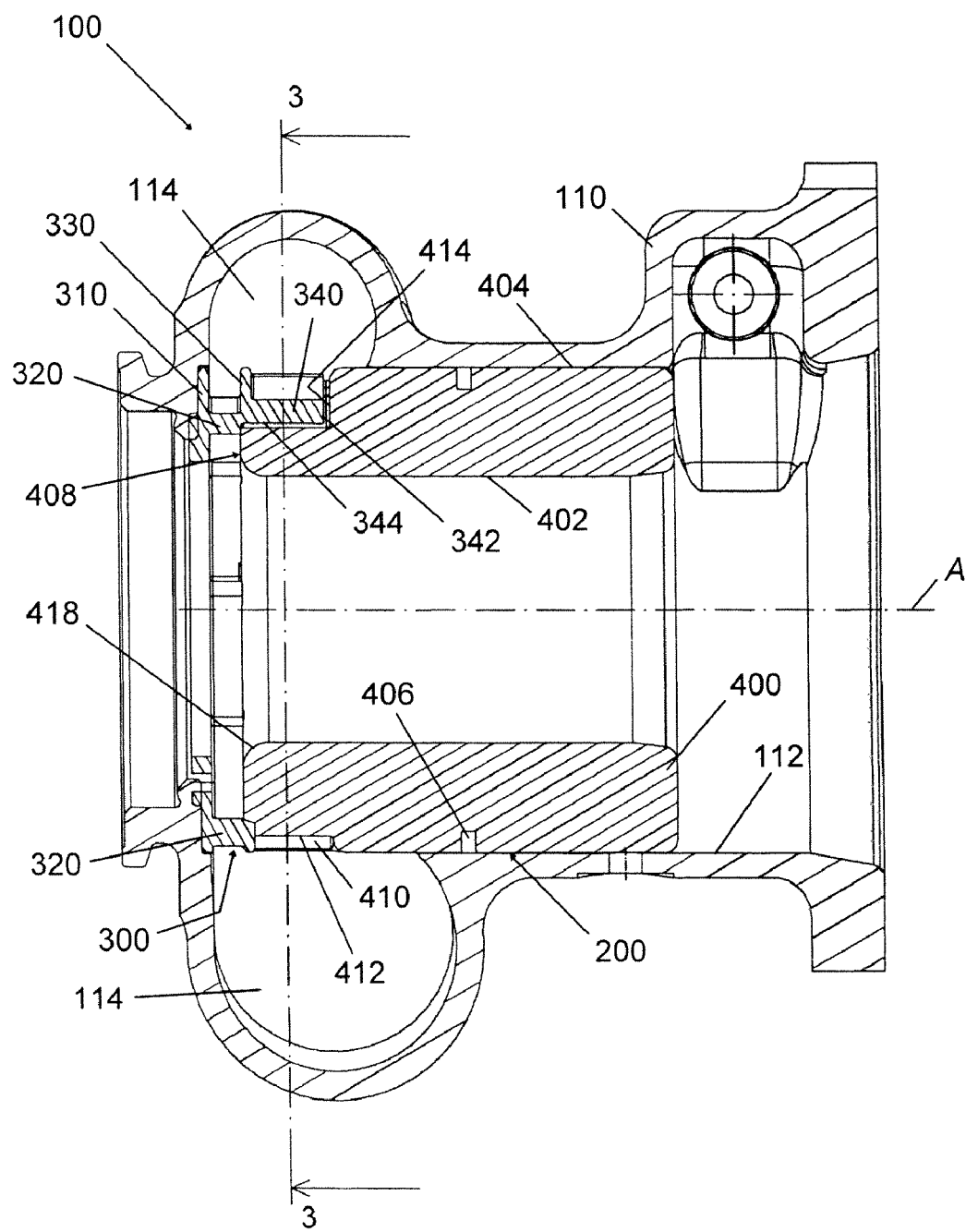
FIG. 2 is an axial cross-sectional view through a turbine assembly in accordance with one embodiment of the invention.
Figure 3:
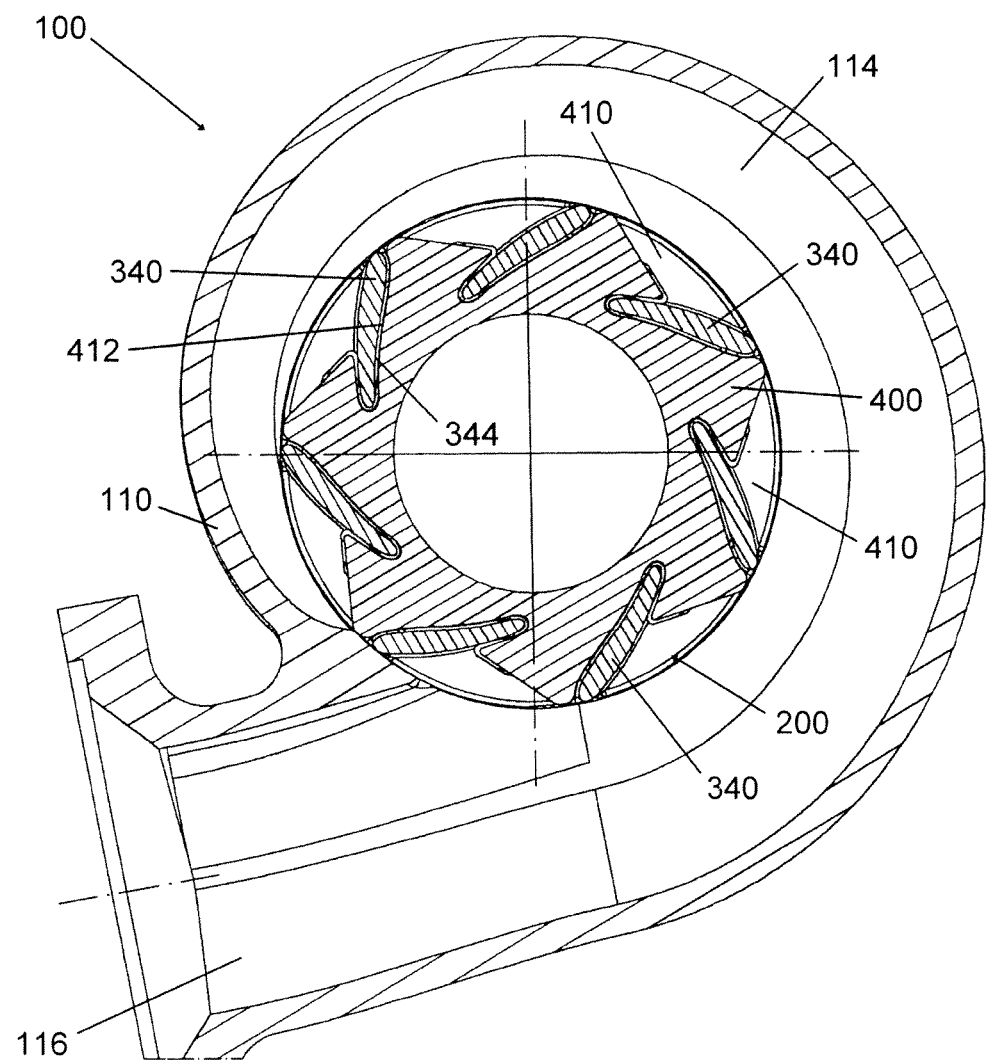
FIG. 3 is a cross-sectional view along line 3-3 in FIG. 2, showing the piston in the closed position.
Figure 4:
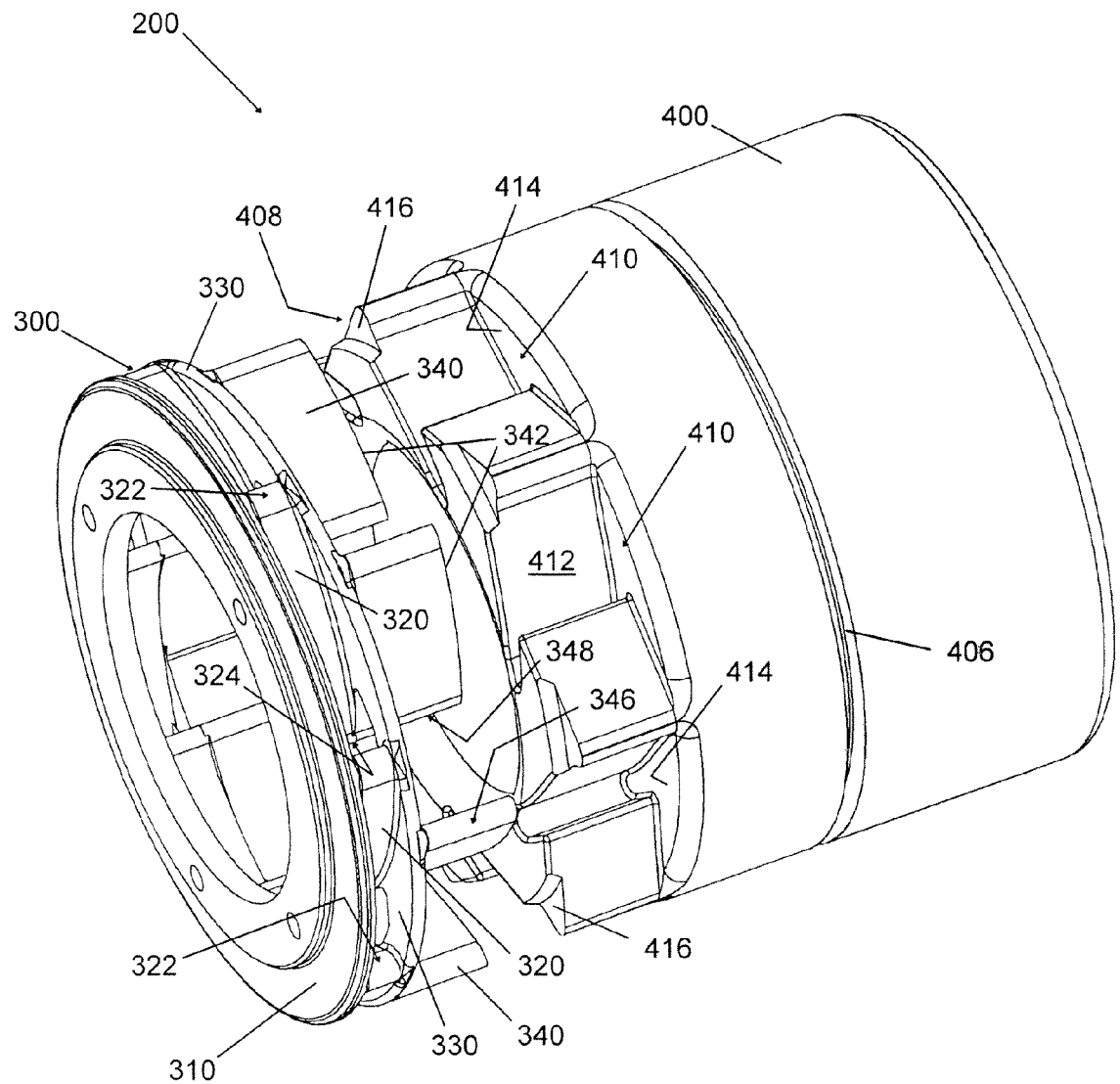
FIG. 4 is a perspective view of the sub-assembly similar to FIG. 1, but with the piston in the open position.
Figure 5:
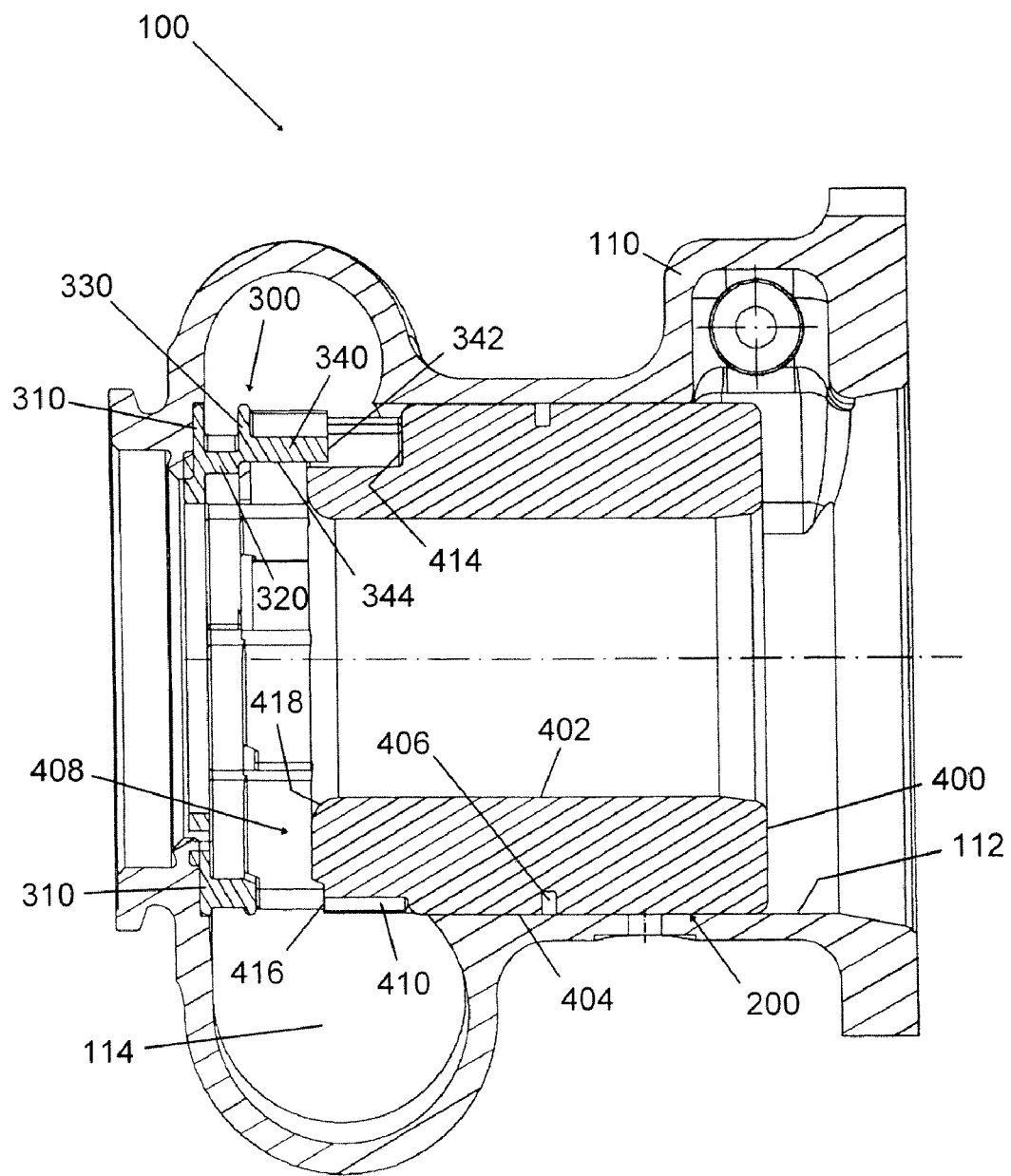
FIG. 5 is an axial cross-sectional view similar to FIG. 2, but with the piston in a partially open position.

A turbine assembly 100 in accordance with one embodiment of the invention is shown in FIGS. 2, 3, and 5. A subassembly 200 of the turbine assembly is shown in isolation in FIGS. 1 and 4. With initial reference to FIGS. 2 and 3 showing the complete turbine assembly 100, the assembly includes a turbine housing 110 defining a bore 112 therein, the bore extending along an axis A. When the assembly 100 is installed in a turbocharger (not shown), a turbine wheel (not shown) is mounted in the upstream (left-hand) end of the bore 112 and is connected to a rotatable shaft (not shown) whose opposite end is connected to a compressor wheel (not shown). The turbine housing 110 also defines a generally annular or toroidal chamber 114 that surrounds the bore 112 and that is open on its radially inner side such that the interior of the chamber 114 is in fluid communication with the bore 112. Exhaust gas, which is supplied from an internal combustion engine into the chamber 114, flows from the chamber through the open radially inner side thereof into the turbine wheel mounted in the bore, and the gas drives the turbine wheel, which in turn drives the compressor wheel. After passing through the turbine wheel, the exhaust gas flows generally axially (parallel to the axis A) through the bore 112 (in the left-to-right direction in FIG. 2) and is exhausted therefrom.

Mounted in the bore 112 of the turbine housing is a subassembly 200, shown in isolation in FIGS. 1 and 4. The sub-assembly includes a nozzle ring/vane assembly 300 fixedly secured in the turbine housing and a sliding half-collar piston 400 mounted so as to be axially slidable relative to the turbine housing and nozzle ring/vane assembly in a direction parallel to the axis A. The nozzle ring/vane assembly 300 comprises a first nozzle ring 310 of generally annular configuration, and a plurality of first vanes 320 having first ends affixed to the first nozzle ring and circumferentially spaced about the ring's circumference. Each of the first vanes 320 extends generally parallel to the axis A from the first end to an opposite second end. The nozzle ring/vane assembly 300 further comprises a second nozzle ring 330 affixed to at least portions of the second ends of the first vanes 320. The second nozzle ring comprises a generally annular configuration. The nozzle ring/vane assembly 300 also includes a plurality of second vanes 340 having first ends at least portions of which are affixed to the second nozzle ring 330. The second vanes 340 are circumferentially spaced about the circumference of the second nozzle ring. Although it is not essential, advantageously the second vanes 340 differ in configuration from the first vanes 320. Each second vane 340 extends generally parallel to the axis A from the first end to an opposite second end 342, the second end 342 being a free end in the illustrated embodiment.

The turbine assembly 100 thus has a first-stage nozzle delimited between the first nozzle ring 310 and the second nozzle ring 330, the first-stage nozzle having first vanes 320. The turbine assembly also has a second-stage nozzle delimited between the second nozzle ring 330 and a wall of the turbine housing 110 spaced downstream from the second nozzle ring, the second-stage nozzle having second vanes 340.

The half-collar piston 400 comprises a generally tubular structure having a radially inner surface 402 and a radially outer surface 404. In the illustrated embodiment, the outer surface 404 is only slightly smaller in diameter than the inner surface of the bore 112 in the turbine housing, and a seal ring (not shown) is retained in a groove 406 in the outer surface 404 of the piston for sealing against the inner surface of the bore 112 while allowing the piston 400 to slide axially back and forth in the bore. In alternative embodiments (not shown), an intermediate sleeve or carrier (not shown) can be fixedly mounted in the bore 112 and the piston can sealingly engage the inner surface of the carrier. The piston 400 has an upstream end 408 (i.e., the left-hand end in FIGS. 1, 2, 4, and 5) that radially overlaps the second vanes 340, and the second vanes engage the piston in a manner substantially preventing rotation of the piston about an axis thereof. More particularly, the radially outer surface of the upstream end 408 of the piston defines a series of circumferentially spaced recesses 410 that extend only partially through the radial thickness of the piston wall at the upstream end, each recess 410 being configured to receive one of the second vanes 340 when the piston is in closed or partially open positions, as best seen in FIGS. 1-3 and 5. A radially inwardly facing surface 344 of each second vane 340 confronts a radially outwardly facing wall 412 of the respective recess 410. In preferred embodiments as illustrated, the recesses 410 in the piston 400 surround only a fractional part of a girth of each second vane 340. For example, but not by way of limitation, each recess 410 can surround less than about three-quarters of the girth of each second vane 340, as best seen in FIG. 3. In the illustrated embodiment, the second end 342 of each second vane 340 comprises a free end, and the second ends 342 abut or nearly abut a wall 414 of the piston when it is in the closed position as shown in FIG. 2.

In one embodiment as illustrated, the second nozzle ring 330 divides only part of the second end of each first vane 320 from part of the first end of each second vane 340. More particularly, with reference to FIG. 4, the second nozzle ring 330 divides a leading edge region 322 of the second end of each first vane 320 from a leading edge region 346 of the first end of each second vane 340, but trailing edge regions of the first and second vanes are not divided by the second nozzle ring. For example the trailing edge 324 of each first vane 320 and the trailing edge 348 of each second vane 340 can comprise a continuous vane portion in the axial direction, as best seen in FIG. 4. In contrast, for example, the leading edge 322 of each first vane 320 can be set at a different angle of attack from the leading edge 346 of each second vane 340. Alternatively, the second nozzle ring 330 can completely divide the entire second end of each first vane from the entire first end of each second vane.

As illustrated, in one embodiment, the piston 400 includes an end surface facing generally axially toward the second nozzle ring 330, and that end surface has recesses 416 (FIG. 4) for receiving portions of the second nozzle ring.

When the turbine assembly 100 employs the second nozzle ring 330 that only partially divides the first vanes 320 from the second vanes 340, it is particularly advantageous for the second nozzle ring 330 to divide the leading edge regions of the vanes from each other, as opposed to dividing the trailing edge regions. In this way, the second nozzle ring 330 is at a larger radius from the axis A, which reduces the negative flow-constriction effect that the second nozzle ring presents. The use of such a second nozzle ring or "semi-divider" 330 allows the shapes of the first vanes 320 and second vanes 340 to be optimized independently in the leading edge regions. Additionally, the wheel shroud contour 418 (FIGS. 2 and 5) can be machined solely on the piston 400, as opposed to the wheel shroud contour being partially defined by the divider or second nozzle ring as is necessary when a "full" divider configuration is employed. With the semi-divider 330, the flow constriction as the piston opens occurs near the middle of the second vanes 340, sufficiently far from the turbine wheel to reduce the resulting negative effect on efficiency.

The turbine assembly 100 in some embodiments can include a divided volute (not shown) in which a first portion of the volute supplies exhaust gas to the first-stage nozzle and a second portion of the volute supplies exhaust gas to the second-stage nozzle.

In some embodiments, the turbine wheel can be a "splittered" turbine wheel (not shown) in which there are full-length blades alternating with partial-length blades. An example of such a splittered turbine wheel is described in published PCT application WO 2004/074642 A1 to Lombard et al., entitled "Turbine Having Variable Throat", published on Sep. 2, 2004, the entire disclosure of which is incorporated herein by reference. The full-length blades have a greater length in the axial direction than do the partial-length blades. More particularly, the full-length blades can be configured and positioned such that they span substantially the full axial extent of the combined first-stage and second-stage nozzles when the piston 400 is fully open. The partial-length blades can be configured and positioned such that they span the axial extent of at least the first-stage nozzle. Accordingly, the exhaust gas flowing through the first-stage nozzle encounters both the full-length and partial-length blades. When the piston is open or partially open, the exhaust gas flowing through the second-stage nozzle encounters only (or primarily) the portions of the full-length blades extending downstream of the trailing edges of the partial-length blades.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbine assembly for a turbocharger, comprising:
   a turbine housing defining a bore extending along an axial direction and defining a chamber surrounding the bore for receiving exhaust gas, the chamber being open to the bore at a radially inner side of the chamber;
   a first-stage nozzle comprising a first nozzle ring mounted in the turbine housing and a plurality of circumferentially spaced first vanes each having a first end connected to the first nozzle ring and each extending generally parallel to the axial direction from the first end to an opposite second end;
   a second-stage nozzle comprising a second nozzle ring connected to the second ends of the first vanes and a plurality of circumferentially spaced second vanes each having a first end connected to the second nozzle ring and each extending generally parallel to the axial direction from the first end to an opposite second end, wherein the second nozzle ring divides only part of the second end of each first vane from part of the first end of each second vane; and
   a tubular piston disposed in the bore of the turbine housing, the piston being axially slidable relative to the turbine housing along the radially inner side of the chamber such that the piston blocks a variable portion of an axial length of the second-stage nozzle depending on axial position of the piston, the piston in a closed position thereof substantially closing the second-stage nozzle while the first-stage nozzle remains open such that exhaust gas flows to the turbine wheel via the first-stage nozzle, the piston in non-closed positions permitting flow through the second-stage nozzle.

2. The turbine assembly of claim 1, wherein the second vanes differ in configuration from the first vanes.

3. The turbine assembly of claim 1, wherein the piston has a radially outer surface in which recesses are formed for respectively receiving the second vanes with a radially inwardly facing surface of each second vane confronting a radially outwardly facing wall of each respective recess.

4. The turbine assembly of claim 3, wherein the recesses in the piston surround only a fractional part of a girth of each second vane.

5. The turbine assembly of claim 4, wherein the recesses surround less than about three-quarters of the girth of each second vane.

6. The turbine assembly of claim 3, wherein the second end of each second vane comprises a free end, and wherein the second ends of the second vanes abut or nearly abut a wall of the piston in the closed position of the piston.

7. The turbine assembly of claim 1, wherein the second end of each second vane comprises a free end axially spaced from the downstream wall, and wherein the second ends of the second vanes abut or nearly abut a wall of the piston in the closed position of the piston.

8. The turbine assembly of claim 1, wherein the second nozzle ring divides a leading edge region of the second end of each first vane from a leading edge region of the first end of each second vane, and wherein trailing edge regions of the first and second vanes are not divided by the second nozzle ring.

9. The turbine assembly of claim 1, wherein the piston has a radially outer surface in which recesses are formed for respectively receiving the second vanes with a radially inwardly facing surface of each second vane confronting a radially outwardly facing wall of each respective recess.

10. The turbine assembly of claim 9, wherein the piston includes an end surface facing generally axially toward the second nozzle ring and having recesses for receiving portions of the second nozzle ring.

11. The turbine assembly of claim 9, wherein the recesses in the piston surround only a fractional part of a girth of each second vane.

12. The turbine assembly of claim 11, wherein the recesses surround less than about three-quarters of the girth of each second vane.

13. The turbine assembly of claim 9, wherein the second end of each second vane comprises
  a free end axially spaced from the downstream wall, and wherein the second ends of the second vanes abut a wall of the piston in the closed position of the piston.

14. The turbine assembly of claim 1, wherein the second vanes engage the piston in a manner substantially preventing rotation of the piston about an axis thereof.

* * * * *